United States Patent
Goller et al.

(10) Patent No.: US 8,506,660 B2
(45) Date of Patent: Aug. 13, 2013

(54) NOZZLES FOR USE WITH GASIFIERS AND METHODS OF ASSEMBLING THE SAME

(75) Inventors: George Albert Goller, Greenville, SC (US); Paul Stephen Dimascio, Greer, SC (US)

(73) Assignee: General Electric Company, Schenectady, NY (US)

( * ) Notice: Subject to any disclaimer, the term of this patent is extended or adjusted under 35 U.S.C. 154(b) by 736 days.

(21) Appl. No.: 11/854,080

(22) Filed: Sep. 12, 2007

(65) Prior Publication Data
US 2009/0064587 A1    Mar. 12, 2009

(51) Int. Cl.
*B05B 15/00* (2006.01)
(52) U.S. Cl.
USPC ............................................. 48/61; 239/132.3
(58) Field of Classification Search
USPC ................... 239/125, 127.1, 128–139
See application file for complete search history.

(56) References Cited

U.S. PATENT DOCUMENTS

| | | | |
|---|---|---|---|
| 3,920,417 A | 11/1975 | Fernandes | |
| 4,086,757 A | 5/1978 | Karstensen et al. | |
| 4,106,457 A * | 8/1978 | Totten et al. | 123/557 |
| 5,688,296 A | 11/1997 | Andrus, Jr. et al. | |
| 5,715,671 A | 2/1998 | Griffiths | |
| 6,061,936 A | 5/2000 | Jahnke | |
| 6,672,069 B1 | 1/2004 | Stuhlmuller et al. | |
| 6,824,575 B1 | 11/2004 | Otomo et al. | |
| 6,910,852 B2 | 6/2005 | Simeone et al. | |
| 6,923,004 B2 | 8/2005 | Chandran et al. | |
| 7,003,957 B2 | 2/2006 | Griffin et al. | |
| 2001/0020503 A1* | 9/2001 | Stratton | 148/712 |
| 2003/0196576 A1* | 10/2003 | Whittaker et al. | 110/260 |
| 2008/0006609 A1* | 1/2008 | Schoenemann et al. | 218/157 |

* cited by examiner

*Primary Examiner* — Imran Akram
(74) *Attorney, Agent, or Firm* — Armstrong Teasdale LLP

(57) ABSTRACT

A method for assembling a nozzle is provided. The method includes providing an injection tube that includes an outlet that is configured to discharge fuel therefrom. A face plate is also provided that extends about the injection tube such that the face plate substantially circumscribes the outlet. A cooling chamber is defined within the injection tube and configured to channel cooling fluid adjacent to the face plate. At least one surface defining the cooling chamber is configured to disrupt a flow of the cooling fluid flowing through the cooling chamber.

17 Claims, 2 Drawing Sheets

NOZZLES FOR USE WITH GASIFIERS AND METHODS OF ASSEMBLING THE SAME

BACKGROUND OF THE INVENTION

This invention relates generally to gasifiers and, more specifically, to methods and systems for assembling nozzles used with gasifiers.

Gasifiers convert a mixture of fuel, oxygen, steam, and/or limestone into syngas that may be used as fuel by a gas turbine engine. Within at least some known gasifiers, fuel is supplied to the gasifier via an injection nozzle that is coupled in flow communication to a fuel supply. During operation of the gasifier, the injection nozzle is exposed to high temperatures that over time may thermally damage the nozzle.

To facilitate reducing damage to gasifier nozzles, at least some known nozzles include a face plate that substantially circumscribes a discharge end of the nozzle. The face plate is configured to shield the remainder of the nozzle from the high temperatures within the gasifier. Some known nozzles also include a cooling chamber that circulates cooling fluid adjacent to the face plate to facilitate cooling the face plate. However, despite the cooling chamber, the face plate may still become damaged during operation of the gasifier. Often, depending on the severity of the damage to the face plate, the entire injection nozzle must be replaced.

BRIEF DESCRIPTION OF THE INVENTION

In one aspect, a method for assembling a nozzle is provided. The method includes providing an injection tube that includes an outlet that is configured to discharge fuel therefrom. A face plate is also provided that extends about the injection tube such that the face plate substantially circumscribes the outlet. A cooling chamber is defined within the injection tube and configured to channel cooling fluid adjacent to the face plate. At least one surface defining the cooling chamber is configured to disrupt a flow of the cooling fluid flowing through the cooling chamber.

In another aspect, a nozzle for a gasifier is provided. The nozzle includes an injection tube comprising an outlet configured to discharge fuel into the gasifier, and a face plate substantially circumscribing the outlet. The nozzle also includes a cooling chamber defined within the injection tube. The cooling chamber is configured to channel cooling fluid adjacent to the face plate. The cooling chamber is defined by an inner surface that is configured to disrupt a flow of the cooling fluid within the cooling chamber.

In yet another aspect, a gasifier is provided. The gasifier includes a fuel supply that channels fuel to the gasifier, and a nozzle that discharges the fuel into the gasifier. The nozzle includes an injection tube comprising an outlet configured to discharge fuel into the gasifier, and a face plate substantially circumscribing the outlet. The nozzle also includes a cooling chamber defined within the injection tube. The cooling chamber is configured to channel steam adjacent to the face plate. The cooling chamber is defined by an inner surface that is configured to disrupt a flow of the steam within the cooling chamber.

DETAILED DESCRIPTION OF THE INVENTION

The present invention provides a nozzle for use with a gasifier. During operation of the gasifier, the nozzle injects fuel into the gasifier. Because of the position of the nozzle relative to the gasifier, a face plate of the nozzle is subject to high temperatures resulting from the combustion of the fuel. Accordingly, in the exemplary embodiment, the nozzle includes a cooling chamber that is configured to receive fluid to facilitate cooling the face plate. Moreover, in the exemplary embodiment, the cooling chamber also includes a turbulated surface that disrupts the flow of fluid flowing within the cooling chamber to facilitate increasing an amount of heat transfer between the face plate and the fluid.

It should be noted that although the present invention is described with respect to gasifiers, one of ordinary skill in the art should understand that the present invention is not limited to being used only in gasifiers. Rather, the present invention may be used in any system that requires cooling of a component. Further, for simplicity, the present invention is only described herein with respect to cooling fluid. However, as should be appreciated by one of ordinary skill in the art, the present invention is not limited to cooling fluid; but rather, the present invention may be used to circulate any fluid.

Figure 1:
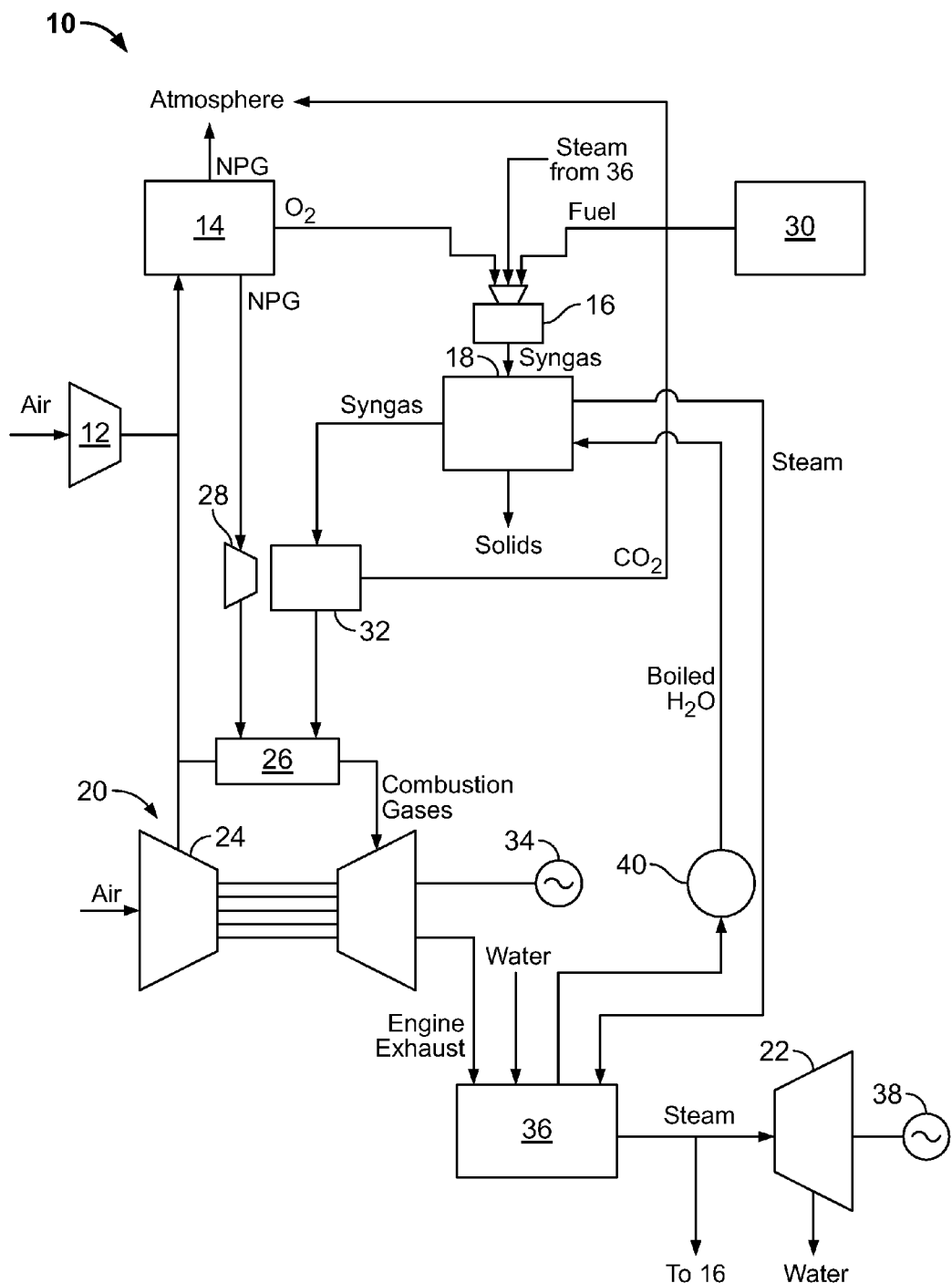
FIG. 1 is a schematic illustration of an exemplary integrated gasification combined cycle (IGCC) system including a gasifier.

FIG. 1 is a schematic diagram of an exemplary integrated gasification combined-cycle (IGCC) power generation system 10. IGCC system 10 generally includes a main air compressor 12, an air separation unit (ASU) 14 coupled in flow communication to compressor 12, a gasifier 16 coupled in flow communication to ASU 14, a syngas cooler 18 coupled in flow communication to gasifier 16, a gas turbine engine 20 coupled in flow communication to syngas cooler 18, and a steam turbine 22 coupled in flow communication to syngas cooler 18.

In operation, compressor 12 compresses ambient air that is then channeled to ASU 14. In the exemplary embodiment, in addition to compressed air from compressor 12, compressed air from a gas turbine engine compressor 24 is supplied to ASU 14. Alternatively, compressed air from gas turbine engine compressor 24 is supplied to ASU 14, rather than compressed air from compressor 12 being supplied to ASU 14. In the exemplary embodiment, ASU 14 uses the compressed air to generate oxygen for use by gasifier 16. More specifically, ASU 14 separates the compressed air into separate flows of oxygen ($O_2$) and a gas by-product, sometimes referred to as a "process gas". The $O_2$ flow is channeled to gasifier 16 for use in generating partially combusted gases, referred to herein as "syngas" for use by gas turbine engine 20 as fuel, as described below in more detail.

The process gas generated by ASU 14 includes nitrogen and will be referred to herein as "nitrogen process gas" (NPG). The NPG may also include other gases such as, but not limited to, oxygen and/or argon. For example, in the exemplary embodiment, the NPG includes between about 95% and about 100% nitrogen. In the exemplary embodiment, at least some of the NPG flow is vented to the atmosphere from ASU 14, and at some of the NPG flow is injected into a combustion zone (not shown) within a gas turbine engine combustor 26 to facilitate controlling emissions of engine 20, and more specifically to facilitate reducing the combustion temperature and reducing nitrous oxide emissions from engine 20. In the exemplary embodiment, IGCC system 10 includes a compressor 28 for compressing the nitrogen process gas flow before being injected into the combustion zone of gas turbine engine combustor 26.

In the exemplary embodiment, gasifier 16 converts a mixture of fuel supplied from a fuel supply 30, $O_2$ supplied by ASU 14, steam, and/or limestone into an output of syngas for use by gas turbine engine 20 as fuel. Although gasifier 16 may use any fuel, gasifier 16, in the exemplary embodiment, uses coal, petroleum coke, residual oil, oil emulsions, tar sands, and/or other similar fuels. Furthermore, in the exemplary embodiment, the syngas generated by gasifier 16 includes carbon dioxide.

In the exemplary embodiment, syngas generated by gasifier 16 is channeled to syngas cooler 18 to facilitate cooling the syngas, as described in more detail below. The cooled syngas is channeled from cooler 18 to a clean-up device 32 for cleaning the syngas before it is channeled to gas turbine engine combustor 26 for combustion thereof. Carbon dioxide ($CO_2$) may be separated from the syngas during clean-up and, in the exemplary embodiment, may be vented to the atmosphere. Gas turbine engine 20 drives a generator 34 that supplies electrical power to a power grid (not shown). Exhaust gases from gas turbine engine 20 are channeled to a heat recovery steam generator 36 that generates steam for driving steam turbine 22. Power generated by steam turbine 22 drives an electrical generator 38 that provides electrical power to the power grid. In the exemplary embodiment, steam from heat recovery steam generator 36 is supplied to gasifier 16 for generating syngas.

Furthermore, in the exemplary embodiment, system 10 includes a pump 40 that supplies boiled water from steam generator 36 to syngas cooler 18 to facilitate cooling the syngas channeled from gasifier 16. The boiled water is channeled through syngas cooler 18 wherein the water is converted to steam. The steam from cooler 18 is then returned to steam generator 36 for use within gasifier 16, syngas cooler 18, and/or steam turbine 22.

Figure 2:
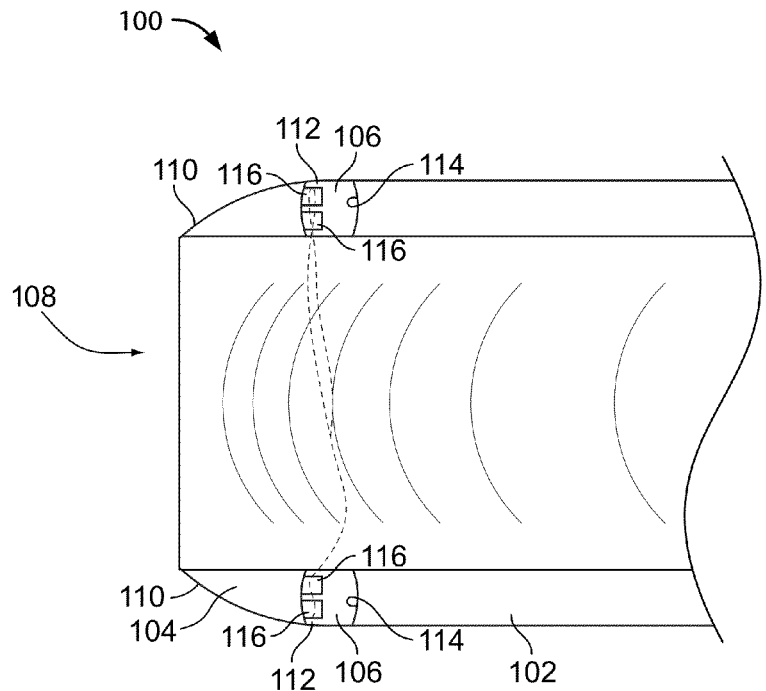
FIG. 2 is a cross-sectional view of a portion of an exemplary nozzle that may be used with the IGCC system shown in FIG. 1 to inject fuel into the gasifier shown in FIG. 1.

FIG. 2 is a cross-sectional view of a portion of an exemplary nozzle 100 that may be used with fuel supply 30 to discharge fuel into gasifier 16. In the exemplary embodiment, nozzle 100 includes an injection tube 102, a face plate 104, and a cooling chamber 106. Injection tube 102 defines an outlet 108 that is configured to discharge fuel into gasifier 16. Face plate 104 substantially circumscribes outlet 108 and includes an outer surface 110 and an opposite inner surface 112. In the exemplary embodiment, cooling chamber 106 is positioned adjacent face plate 104. Specifically, in the exemplary embodiment, cooling chamber 106 also substantially circumscribes outlet 108 and extends along face plate inner surface 112 such that face plate inner surface 112 defines a portion of an inner surface 114 of cooling chamber 106. In the exemplary embodiment, and as described in more detail below, cooling chamber inner surface 114 is turbulated. More specifically, cooling chamber inner surface 114 includes a plurality of projections 116 that extend outward therefrom. In the exemplary embodiment, projections 116 are formed in face plate inner surface 112. Alternatively, projections 116 are formed in any portion of cooling chamber inner surface 114.

During operation, fuel is discharged from outlet 108 for combustion in gasifier 16. Accordingly, face plate outer surface 110 is exposed to high temperatures during the combustion. Cooling chamber 106 facilitates cooling face plate 104 by channeling a cooling fluid across face plate inner surface 112. In the exemplary embodiment, steam is used as the cooling fluid. In an alternative embodiment, cooling chamber 106 channels any cooling fluid that facilitates cooling face plate 104 as described herein. Projections 116 disrupt the flow of cooling fluid channeled through cooling chamber 106 and cause the cooling fluid to become turbulated. As a result, an amount of contact between the turbulated cooling fluid and face plate inner surface 112 is increased. Accordingly, an amount of heat transfer between face plate 104 and the cooling fluid is also increased. The increased heat transfer facilitates cooling face plate 104 to extend the useful life of face plate 104. As such, projections 116 facilitate decreasing costs associated with the maintenance and repair of nozzle 100.

Figure 3:
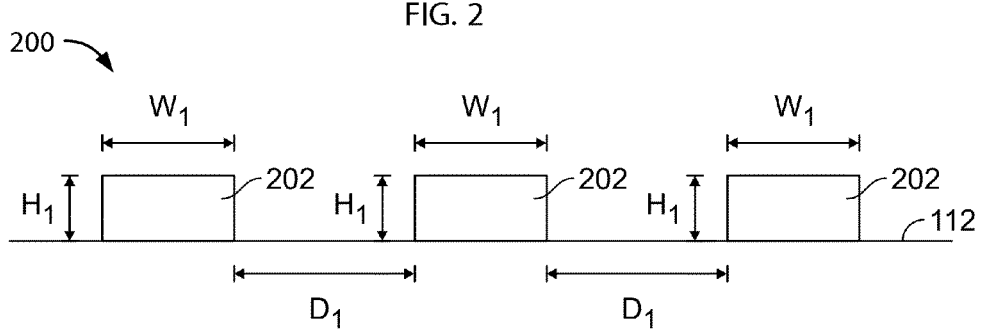
FIG. 3 is a schematic view of a turbulated surface that may be used with the nozzle shown in FIG. 2.

FIG. 3 is a schematic view of a turbulated surface 200 that may be used with nozzle 100 (shown in FIG. 2). In the exemplary embodiment, turbulated surface 200 is formed on face plate inner surface 112. However, as should be appreciated by one of ordinary skill in the art, turbulated surface 200 may be formed on any portion of cooling chamber inner surface 114. In the exemplary embodiment, turbulated surface 200 includes a plurality of projections 202 that extend outward from inner surface 112. In the exemplary embodiment, projections 202 are identical and each projection 202 extends outward the same height $H_1$ from inner surface 112. In an alternative embodiment, projections 202 are formed with any height that enables turbulated surface 200 to function as described herein.

In the exemplary embodiment, each projection 202 is formed with a width $W_1$. In an alternative embodiment, adjacent projections 202 can have any size that enables turbulated surface 200 to function as described herein. Moreover, in the exemplary embodiment, projections 202 are equally spaced a distance $D_1$ apart across surface 112. In an alternative embodiment, adjacent projections 202 can be spaced at any orientation that enables turbulated surface 200 to function as described herein. Moreover, in the exemplary embodiment, each projection 202 has a substantially rectangular shape. In alternative embodiments, projections 202 may have any non-rectangular shape that enables turbulated surface 200 to function as described herein.

During operation, turbulated surface 200 disrupts and induces tribulation into the flow of the cooling fluid flowing through cooling chamber 106. As such, an amount of contact between the turbulated cooling fluid and face plate inner surface 112 is increased. Accordingly, an amount of heat transfer between face plate 104 and the cooling fluid is facilitated to be increased. The increased heat transfer facilitates cooling face plate 104 to extend the useful life of face plate 104. As such, projections 202 facilitate decreasing costs associated with the maintenance and repair of nozzle 100.

Figure 4:
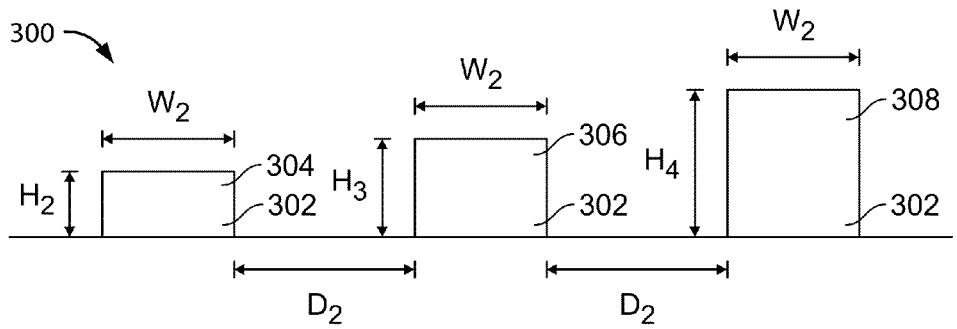
FIG. 4 is a schematic view of an alternative turbulated surface that may be used with the nozzle shown in FIG. 2.

FIG. 4 is a schematic view of an alternative turbulated surface 300 that may be used with nozzle 100 (shown in FIG. 2). In the exemplary embodiment, turbulated surface 300 is formed on face plate inner surface 112. However, as should be appreciated by one of ordinary skill in the art, turbulated surface 300 may be formed on any portion of cooling chamber inner surface 114. In the exemplary embodiment, turbulated surface 300 includes a plurality of projections 302 that extend outward from inner surface 112. In the exemplary embodiment, a first projection 304 extends outward a height $H_2$ from inner surface 112; a second projection 306 extends outward a height $H_3$ from inner surface 112; and a third projection 308 extends outward a height $H_4$ from inner surface 112. In the exemplary embodiment, height $H_3$ is greater than height $H_2$, and height $H_4$ is greater than height $H_3$. In an alternative embodiment, projections 302 are formed with any height that enables turbulated surface 300 to function as described herein.

In the exemplary embodiment, each projection 302 is formed with a width $W_2$. In an alternative embodiment, adjacent projections 302 can have any size that enables turbulated surface 300 to function as described herein. Moreover, in the exemplary embodiment, adjacent projections 302 are equally spaced a distance $D_2$ apart across surface 112. In an alternative embodiment, adjacent projections 302 can be spaced at any orientation that enables turbulated surface 300 to function as described herein. Moreover, in the exemplary embodiment, each projection 302 has a substantially rectangular shape. In alternative embodiments, projections 302 may have any non-rectangular shape that enables turbulated surface 300 to function as described herein.

During operation, turbulated surface 300 disrupts and induces turbulation into the flow of the cooling fluid flowing through cooling chamber 106. As such, an amount of contact between the turbulated cooling fluid and face plate inner surface 112 is increased. Accordingly, an amount of heat transfer between face plate 104 and the cooling fluid is facilitated to be increased. The increased heat transfer facilitates cooling face plate 104 to extend the useful life of face plate 104. As such, projections 202 facilitate decreasing costs associated with the maintenance and repair of nozzle 100.

In one embodiment, a method for assembling a nozzle is provided. The method includes providing an injection tube that includes an outlet that is configured to discharge fuel therefrom, and extending a face plate about the injection tube such that the face plate substantially circumscribes the outlet. The method also includes forming a cooling chamber within the injection tube. The cooling chamber is configured to channel cooling fluid adjacent to the face plate. At least one surface defining the cooling chamber is configured to disrupt a flow of the cooling fluid flowing through the cooling chamber. In the exemplary embodiment, the cooling chamber is configured to channel steam adjacent to the face plate.

Further, in the exemplary embodiment, the method includes forming a cooling chamber including a plurality of projections that extend outward from at least one surface defining the cooling chamber. In one embodiment, the method includes forming a first projection that extends outward from the surface of the cooling chamber, and forming a second projection in a configuration that is distinct from a configuration of the first projection. Moreover, in the exemplary embodiment, the method includes forming a cooling chamber that is at least partially defined by an inner surface of the face plate. In such an embodiment, the inner surface of the face plate is configured to disrupt the flow of the cooling fluid flowing through the cooling chamber. In addition, in one embodiment, the method includes forming a cooling chamber that circumscribes the outlet.

The above-described systems and methods facilitate increasing an amount of heat transfer between a cooling fluid and a face plate of a nozzle. Specifically, a surface of the cooling chamber is turbulated to disrupt the flow of cooling fluid flowing therethrough. Accordingly, an amount of contact between the cooling fluid and the face plate is increased, thereby increasing an amount of heat transfer between the cooling fluid and the face plate.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for fabricating a gasifier nozzle are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, those skilled in the art will recognize that the invention can be practiced with modification within the spirit and scope of the claims.

What is claimed is:

1. A method for assembling a nozzle, said method comprising:
   providing an injection tube that includes an outlet that is configured to discharge fuel therefrom into a gasifier; and
   providing a face plate that extends about the injection tube such that the face plate substantially circumscribes the outlet, wherein the face plate includes an outer surface and an opposite inner surface such that the outer surface defines a discharge end of the nozzle adjacent the outlet;
   defining a cooling chamber within the injection tube that extends along the face plate inner surface, and that is configured to channel cooling fluid adjacent to the face plate such that the cooling fluid is substantially isolated from the fuel in the injection tube;
   forming a plurality of projections extending substantially perpendicularly from the face plate inner surface and only partially across the cooling chamber;
   orienting the plurality of projections to turbulate a flow of the cooling fluid flowing through the cooling chamber and to facilitate increasing contact between the turbulated cooling fluid and the face plate.

2. A method in accordance with claim 1 wherein providing a face plate further comprises:
   forming a first projection that extends outward from the surface of the cooling chamber; and
   forming a second projection in a configuration that is distinct from a configuration of the first projection.

3. A method in accordance with claim 1 wherein providing a face plate further comprises forming the cooling chamber to be at least partially defined by the face plate inner surface.

4. A method in accordance with claim 3 wherein providing a face plate further comprises forming a cooling chamber wherein the face plate inner surface is configured to turbulate the flow of the cooling fluid flowing through the cooling chamber.

5. A method in accordance with claim 1 wherein providing a face plate further comprises forming a cooling chamber that circumscribes the outlet.

6. A method in accordance with claim 1 wherein providing a face plate further comprises forming a cooling chamber that is configured to channel steam adjacent to the face plate.

7. A nozzle for a gasifier, said nozzle comprising:
   an injection tube comprising an outlet configured to discharge fuel into the gasifier;
   a face plate substantially circumscribing said outlet, said face plate comprising an outer surface and an opposite inner surface such that said outer surface defines a discharge end of said nozzle adjacent said outlet; and
   a cooling chamber defined within said injection tube, said cooling chamber extending along said inner surface and configured to channel cooling fluid adjacent to said face plate and to substantially isolate the cooling fluid from the fuel in the injection tube, said cooling chamber at least partially defined by said inner surface and comprising a plurality of projections extending substantially perpendicularly from said inner surface and only partially across said cooling chamber, said plurality of projections oriented to turbulate a flow of the cooling fluid within said cooling chamber and to facilitate increasing contact between the turbulated cooling fluid and said face plate.

8. A nozzle in accordance with claim 7 wherein said plurality of projections comprises:
a first projection; and
a second projection having a configuration that is distinct from a configuration of the first projection.

9. A nozzle in accordance with claim 7 wherein said cooling chamber is at least partially defined by said face plate inner surface.

10. A nozzle in accordance with claim 9 wherein said face plate inner surface is configured to disrupt the flow of the cooling fluid flowing through said cooling chamber.

11. A nozzle in accordance with claim 7 wherein said cooling chamber circumscribes said outlet.

12. A nozzle in accordance with claim 7 wherein said cooling chamber is configured to channel steam adjacent to said face plate.

13. A gasifier comprising:
a fuel supply that channels fuel to the gasifier; and
a nozzle that discharges the fuel into the gasifier, said nozzle comprising:
an injection tube comprising an outlet configured to discharge the fuel into the gasifier;
a face plate substantially circumscribing said outlet, said face plate comprising an outer surface and an opposite inner surface such that said outer surface defines a discharge end of said nozzle adjacent said outlet; and
a cooling chamber defined within said injection tube, said cooling chamber extending along said inner surface and configured to channel steam adjacent to said face plate and to substantially isolate the cooling fluid from the fuel in the injection tube, said cooling chamber defined by said inner surface and comprising a plurality of projections extending substantially perpendicularly from said inner surface and only partially across said cooling chamber, said plurality of projections oriented to turbulate a flow of the steam within said cooling chamber and to facilitate increasing contact between the turbulated flow of steam and said face plate.

14. A gasifier in accordance with claim 13 wherein said plurality of projections further comprises:
a first projection; and
a second projection having a configuration that is distinct from a configuration of the first projection.

15. A gasifier in accordance with claim 13 wherein said cooling chamber is at least partially defined by said face plate inner surface.

16. A gasifier in accordance with claim 15 wherein said face plate inner surface is configured to turbulate the flow of the cooling fluid flowing through said cooling chamber.

17. A gasifier in accordance with claim 13 wherein said cooling chamber circumscribes said outlet.

* * * * *